United States Patent Office 2,838,444
Patented June 10, 1958

2,838,444
PLATINUM-ALUMINA CATALYST MANUFACTURE

John W. Teter, Chicago, and John L. Gring, Homewood, Ill., and Carl D. Keith, Munster, Ind., assignors to Engelhard Industries, Inc., a corporation of New Jersey No Drawing. Application February 21, 1955
Serial No. 489,726

4 Claims. (Cl. 196—50)

Our invention relates to improved reforming catalysts comprising alumina and platinum or a platinum type metal. The new catalysts are characterized by a unique base structure essentially determined by a particular precursor alumina composition. The invention further relates to the application of the new catalysts in the reforming of light hydrocarbon stocks to produce gasoline of enhanced octane value, benzene and other selected aromatics such as toluene or xylenes.

The catalytic reforming of hydrocarbon stocks involves processing the stock under conditions of elevated temperature and pressure, usually in the presence of a substantial partial pressure of hydrogen, and is based upon one or more reactions representing chemical conversion of the hydrocarbon constituents of the charge stock. The more valuable reforming operations are characterized by utilization of catalysts which promote selectively such hydrocarbon reactions as isomerization of normal paraffins to isoparaffins, dehydrocyclization of normal paraffins to naphthenes and aromatics, dehydrogenation of naphthenes to aromatics, isomerization of 5-membered naphthenic ring compounds to 6-membered naphthenic ring compounds which then may be dehydrogenated to aromatics and hydrocracking of relatively long chain paraffins to shorter chain paraffins. The selection of a catalyst is highly critical and is rendered exceedingly difficult since the equilibria and conditions favoring certain reactions are often unfavorable for other reactions. For example, isomerization is favored in initial rate by high temperature but with respect to equilibrium by low temperature while dehydrogenation is favored by high temperature. The presence of hydrogen favors hydrocracking and tends to suppress dehydrogenation under reforming conditions. The presence of hydrogen, however, is necessary to reduce the formation of coke which tends to poison the catalyst, by blanketing the catalyst surface, by hydrogenating unsaturates that would go to coke by hydrocracking tarry coke precursors in an early stage of their formation by condensation. Although hydrocracking improves octane number, it tends to reduce yield by producing non-condensible hydrocarbon gases, and it contributes towards coke formation by producing hydrocarbon fragments which may coke. Hydrocracking is particularly undesirable in reforming selected hydrocarbon stocks such as a $C_6$ fraction or a $C_7$ fraction to produce respectively benzene or toluene. Our invention provides catalytic means of operation at a high level of both activity and liquid recovery in the production of high octane gasoline, and with special advantage, in the production of selected aromatic hydrocarbons at yield levels and unit cost permitting economical recovery in the form of commercially pure grades.

An even more difficult problem in the commercial application of catalytic reforming in petroleum refining is the development of catalysts having sufficient life or aging stability to provide a reasonably low unit catalyst cost per barrel of charge stock processed. This requires a low rate of activity decline during processing with platinum-type catalysts since these catalysts in general are not susceptible of regeneration or reactivation by the simple means normally available to a petroleum refiner and yet are intrinsically expensive in terms of materials and methods of manufacture. Our invention provides platinum-type catalysts of improved aging stability or catalyst life and thus provides important advantages in reforming operations for production of gasoline or aromatics.

We have discovered that alumina-platinum or platinum-type metal catalysts having unexpected advantages from the standpoint of activity, selectivity and aging result when the hydrogel, or mixture of precursor alumina phases, which is converted to the ultimate alumina base, predominates in crystalline alumina trihydrate. The crystalline trihydrate phase contains one or more forms corresponding to the well-known hydrate forms (see Weiser, Inorganic Colloid Chemistry, 1935, vol. II, pp. 90 and 92), gibbsite ($\gamma$-$Al_2O_3 \cdot 3H_2O$), bayerite ($\alpha$-$Al_2O_3 \cdot 3H_2O$) and a third and previously undescribed crystalline trihydrate form which we have termed randomite. Moreover, the presence in the precursor mixture of a minor amount of a hydrate either in the form of amorphous gelatinous hydrated alumina or in a form corresponding after drying to the monohydrate, e. g. boehmite ($\gamma$-$Al_2O_3 \cdot H_2O$), is essential in producing the desirable catalyst of the invention.

The resulting precursor alumina base compositions show in the dried structure by X-ray analysis a characteristic crystalline or quasi crystalline appearance having a high proportion of accessible pore volume in the form of large pores in contrast to the amorphous character and small pore structure of alumina hydrates as usually employed in catalyst preparation. It is preferred that the precursor alumina compositions should be essentially constituted of minute crystallites as evaluated by X-ray diffraction techniques on samples dried at approximately 110° C. Crystallites of about 1000 Angstrom units or less are indicated. Sometimes when observing the dried samples under an electrom microscope there appears to be particles of sizes greater than 1000 Angstrom units. Since by X-ray diffraction these sizes are not indicated, these larger particles might be composed of separate crystallites. If the larger sizes constitute only a minor portion of the total sample, then it might be that their presence as single crystallites is not indicated by X-ray diffraction since this technique determines the average crystallite size.

Hence our invention provides a reforming catalyst comprising alumina and platinum or other platinum-type metal which is characterized by large pore, high area structure relative to known alumina base reforming catalysts and which is essentially composed of a mixture of gamma alumina modifications corresponding to a mixture of precursor alumina phases in which crystalline trihydrate predominates. Our invention also provides a reforming process for producing gasoline, benzene or other aromatics from light hydrocarbon stocks by contacting the stock under reforming conditions of temperature, pressure and hydrogen partial pressure in the presence of the new catalyst.

The catalysts of our invention may be prepared by a sequence of operations which comprises: forming an alumina hydrogel; converting the alumina hydrogel, which as formed is a highly gelatinous precipitate composed of a mixture of amorphous gelatinous hydrous oxides that normally dry to boehmite or an amorphous appearing alumina hydrate, to a mixture predominating in crystalline trihydrate; incorporating the platinum or metal bearing component and if desired a promoter, e. g. a fluoride, in the mixture of hydrate phases; drying the resulting slurry; and calcining the dried product by treatment at an elevated temperature. Usually, the composition is tableted or extruded into the particular form desired prior to calcination. In preparing the composition relatively pure reagents and special corrosion resistant handling equipment are advantageously used to avoid contaminating sources such as iron.

When the catalyst is prepared by this procedure, the alumina hydrogel is formed by precipitating the gelatinous hydrous oxide from a solution of a soluble aluminum salt such as aluminum chloride. Other soluble sources of aluminum can be employed, for example aluminum sulfate or sodium aluminate, although subsequent removal of sulfate ion, for example, by washing may occasion more difficulty than chloride ion. Ammonium hydroxide is a useful agent for precipitation of the alumina hydrogel from the salt solution. In the gel-forming step pH control is important in obtaining a good rate of conversion, and it is desirable to maintain a pH between about 7 to about 10. For instance, if the pH is too low, the conversion may be inhibited. As an incident to the gel-forming step, extraneous ions introduced in preparation such as chloride ion are removed by washing with water. For example, it is usually desirable to reduce chloride ion in the hydrogel to a concentration of about 0.2% or less.

The conversion of the alumina hydrogel to the desired precursor alumina system may be effected in various ways as by aging the hydrogel which is maintained at a pH of about 7 to about 10 for a period of several days, or as by seeding the hydrogel in the preparation process with crystallites of gibbsite, for example. The transition to the desired phase system predominating in the crystalline trihydrate forms of alumina may be roughly controlled with experience by visual observation. The translucent hydrogel takes on a decidedly whiter and more opaque appearance as the crystallites form and cause light scattering. However, it is desirable to control the transition by sampling, drying the sample to say about 110° C. and determining the distribution of hydrate phases by the technique of X-ray diffraction analysis. Pore volume determinations and surface area measurements as by the BET method are also useful. By this means, the preparation procedure with given materials, operating techniques and equipment may be standardized and then may be controlled as seems necessary with spot analytical checks.

Catalysts of high activity and aging stability may be prepared from the alumina precursor base composition and platinum or other platinum type metal having reforming activity, either alone or in the form of mixtures of the platinum metals. The useful metals include, besides platinum, rhodium, palladium and iridium. These are the face centered cubic crystalline types of the platinum family as distinct from the hexagonal types, ruthenium and osmium, which appear to be of lesser value. Where some hydrocracking to enhance octane number is desirable, the incoporation of an acidic promoter such as fluorine, added as a soluble fluoride, can be effected. Other acidic promoters include silica, zirconia, boria, molybdena, chromia, and the like.

The incorporation of the platinum and the promoter, e. g. fluoride, can be effected in either order. The fluoride is incorporated in the form of a water-soluble compound such as ammonium fluoride or hydrogen fluoride from which the extraneous component will be lost readily by volatilization in the subsequent drying and calcining steps. The platinum may be incorporated by adding an aqueous solution of chlorplatinic acid, for example, to the precursor alumina composition followed by precipitation in situ by an aqueous hydrogen sulfide solution or by gaseous hydrogen sulfide. Another method of platinum incorporation is to admix a platinum sulfide sol of desired concentration with the precursor alumina composition. The resulting slurry in any case is dried, and preferably, the drying operation is conducted rapidly. For example, the drying should be completed in not more than about 24 hours at about a pH of 6 to 9. Various expedients may be applied to accelerate drying by exercising appropriate precautions. For example, the mixture may be dried using a rotary drum type drier, or it may be prefiltered to reduce water content and chloride content prior to drying in an oven, or it may be dried using a drum drier after reslurrying, or it may be spray dried. If desired, the platinum may be incorporated into the aged hydrate base after the base has been dried. Alternatively, the aged hydrate base may be impregnated with platinum after drying and partial to complete removal of water of crystallization. However, an advantageous method is that which includes impregnation of the base before drying.

The dried alumina catalyst mixture then may be formed by a tableting or extruding operation. If the catalyst is to be in finely divided form, a grinding operation may follow calcination. In the case of tableting it is customary to incorporate a die lubricant which advantageously is organic and can be burned out by oxidation in the calcination step. The calcination is effected by burning with an oxygen-containing gas, e. g. by heating the catalyst in the presence of the flowing gas stream at a temperature of about 750° to about 1100° F. for a period of 6 hours. Higher temperatures, e. g. 1200° F., may be employed but the calcination should not be continued to the point of undue catalyst sintering. The calcination can be initiated with a mixture of air and nitrogen and completed with air. When calcining extruded catalyst containing no organic material the use of nitrogen is not necessary. Before use the catalyst can be reduced by subjecting it to contact with flowing hydrogen at a similar temperature and for a period of several hours, e. g. 900° F. and atmospheric pressure for about 1 to about 12 hours. The calcined catalyst contains generally upwards of about 2% by weight of matter volatile at 1100° C. and if calcined at 900° F. with dry air and cooled with dry air, such volatile matter constitutes from about 2 to about 5% of the weight of the catalyst.

The catalyst compositions of our invention contain about 0.1 to about 1 weight percent of platinum or other platinum metal or combination of platinum metals. The form in which the platinum metal is present is not certain except that it is not detectable by X-ray diffraction methods. Thus, if the platinum metal be present as metal crystallites the fact that they are not detectable by X-ray diffraction methods indicates crystallite sizes of less than about 50 Angstrom units. Excess platinum metal in forms detectable or undetectable by X-ray diffraction techniques may be present but has not been found to provide any advantage justifying the expense. When containing fluoride, the catalysts include about 0.2 to about 1.5 weight percent fluoride. In this case an advantageous relationship appears to exist at a fluoride concentration of about 0.75 weight percent and a platinum concentration of about 0.35 weight percent.

As noted above, we have found that the new catalysts are characterized by the existence of the alumina base as a mixture of modifications of gamma alumina which correspond to and derive from a precursor base composition in the uncalcined catalyst of alumina hydrate phases which predominate in the crystalline trihydrate form. By this we mean that the percentage of alumina in the form of crystalline trihydrates must exceed 50% and preferably approximates about 65% to about 95% by weight of the total alumina hydrate composition. The trihydrates present may be gibbsite, bayerite and randomite, the last of which appears to be a trihydrate of crystalline form intermediate the structure of gibbsite and bayerite. We have observed that catalysts prepared from an alumina gel predominating in the gibbsite trihydrate form seem to show outstanding results in terms of activity and aging stability. When bayerite or randomite is present in the alumina hydrate, we have found eta alumina in the calcined catalyst. We have also found it essential to provide in the precursor phases either by separate addition or by control of the hydrate aging at least about 5% and preferably about 10 to about 35% by weight of the alumina monohydrate [(AlO)OH] or amorphous hydrous alumina or their mixture.

When an alumina hydrogel is produced for reforming catalyst preparation by precipitation from a solution of an acidic aluminum salt, it is in the form of amorphous hydrated alumina. Upon drying the gelatinous hydrous alumina is converted to the monohydrate, boehmite, or a form which appears amorphous under X-ray analysis. Conversion to the trihydrate precursor alumina base composition produces a catalyst having a relatively large portion of its pore volume in the form of large pores when compared to known reforming catalysts. Thus known high area oxide catalysts are characterized by pores of about 10 to 50 Angstrom units in size. Typical catalysts made from 100% boehmite alumina have essentially no pores greater than 50 Angstrom units in size and have pore distributions which are very similar to those of silica-alumina catalysts. On the other hand, the catalysts made from aluminas containing high percentages of the crystalline trihydrates in the precursor alumina mixtures have considerable pore volume in the 100 to 1000 Angstrom units pore size range. For example, pore volume distributions determined as a result of nitrogen adsorption-desorption isotherm methods and analysis show that the catalysts of our invention generally have about 0.10 to about 0.5 and preferably about 0.15 to about 0.3 cc./gram of their pore volume, which corresponds to about one-half the total pore volume, in pores greater than about 100 Angstrom units pore size (see Table I below). In the distribution of pore sizes below about 100 Angstrom units, there appears to be little that can be correlated with catalytic properties.

The large pores may be formed by the trihydrates because of the fact that the trihydrates in the uncalcined state are indicated by X-ray diffraction as crystalline materials of about 100 to about 1000 Angstrom units crystallite size. These large pores are not formed during calcination but actually exist in the dried, uncalcined alumina. The large pores do not exist in alumina bases derived from the boehmite or monohydrate form of precursor alumina, either before or after calcination. The boehmite type of precursor alumina is characterized by small crystallite size of the order of 40 Angstrom units before and after calcination and contains substantially no pores larger than 50 Angstrom units. It appears however that the presence of a minor proportion of the boehmite form or the amorphous hydrous alumina or their mixture in the precursor mixture is advantageous in insuring maximum retention of large-pore volume in addition to the normal fine-pore structure during catalyst preparation. Thus those catalysts of our invention characterized by the larger pore volumes contain about 5 to about 35 weight percent of boehmite or amorphous hydrous alumina or their mixture in the precursor mixture.

We have observed a correlation between aging stability which may be expressed in terms of a low rate of activity decline with processing time and pore volume distribution. We have found that catalysts of our invention, in particular those having about 0.2 to about 0.4 cc./gram of their total pore volume in the pore size range of about 100 to about 1000 Angstrom units range, show markedly low rates of activity decline under reforming processing conditions, both for production of gasoline and for production of aromatics.

In addition to pore size and pore volume distribution, the nature of the precursor aluminas influences the ultimate structure and state of the catalyst in other ways that appear to be significant with respect to catalyst performance. Where the monohydrate has crystallite sizes of about 30 to 40 Angstrom units and relatively high surface area, e. g. about 300 square meters per gram determined by nitrogen adsorption methods, the crystallite sizes in the uncalcined trihydrate mixture seem to range largely from about 300 to about 1000 Angstrom units by X-ray diffraction techniques and the surface area approximates only about 60 to about 250 square meters per gram. After calcination of the trihydrate, the alumina crystallite sizes predominantly seem to fall in the range of about 35 to about 65 Angstrom units and the surface area ranges from about 350 to about 550 or somewhat more square meters per gram. If the catalyst base be calcined before platinum impregnation, the area may be somewhat less than about 350 square meters per gram. This situation, i. e. the increase of surface area when the alumina trihydrate is calcined, may have an important influence on the ultimate state of dispersion and the crystallite size of the platinum in the catalyst and, in the case of promoted catalysts, possibly upon contiguity of metal sites to active fluoride or promoter sites. Considered together the average crystallite size of the trihydrate phases, determined dry before calcination, and the pore size distribution after calcination may be an indication of base structure accessibility related to catalyst activity and stability.

We have also observed by X-ray diffraction studies that the platinum which is effective in the catalysts of our invention is not detectable by X-ray diffraction studies and thus does not appear as definite lines. Thus, the effective platinum is in sufficiently finely divided form as to exhibit by X-ray diffraction studies, the substantial absence of crystallites and crystals of size larger than about 50 Angstrom units. A surprising property of the finely dispersed platinum is that it is dissolved to a substantial extent in strong sulfuric acid. This observation suggests that the active platinum may be in some combined form rather than in the form of metallic platinum.

In general, we have found that our catalysts perform under the usual conditions of reforming. The hydrocarbon stock to be reformed is contacted with the catalyst in a reaction zone at an elevated temperature within the range of about 750° to about 1000° F. under a total pressure of about 200 to about 1000 p. s. i. g. and a hydrogen partial pressure approximating from about 3 to about 20 moles of hydrogen per mole of hydrocarbon charge stock. The catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases which usually approximate upwards of about 70% hydrogen are recovered for recycle. In one commercial operation the fixed gases contained about 82% hydrogen. The liquid products then are fractionated in the usual way for recovery of a stabilized gasoline reformate or for recovery of the selected aromatic hydrocarbons.

The optimum processing conditions vary according to the nature of the feed stock, particularly its naphthene content and boiling range. The conditions selected also must account for the nature of the desired products and for the individual selectivity of the particular catalyst. Illustrative processing conditions are indicated by way of example in the following examples illustrating preparation of specific catalyst and determination of physical and chemical properties and performance characteristics.

EXAMPLE I

Twenty-five pounds of (Mallinckrodt's A. R. grade) aluminum chloride hexahydrate were dissolved in 50 liters of deionized water, using a wooden container to prevent contamination. Ammonium hydroxide solution was used as the precipitant and was prepared by mixing equal volumes of 0.90 sp. gr. ammonium hydroxide and deionized water. This was placed in a Pyrex container arranged for addition to the aluminum chloride solution by siphoning.

While vigorously stirring the aluminum chloride solution, the solution of ammonium hydroxide was added at a rate to give a pH of 8.0 to 8.1 in 27 to 30 minutes elapsed time. The flow of ammonium hydroxide solution was stopped at approximately pH 4.7 because of thickening. With continued stirring, fluidity was re-established, after which the ammonium hydroxide addition was continued. Stirring was continued for thirty minutes, and then the precipitate was separated from the mother liquor by means of a plate and frame press. The filter cake from each of 4 batches was redispersed in 15-gallon portions of deionized water and the alumina hydrogel was washed by repeated filtering and reslurrying of the filter cake, with pH adjustment to 8 before filtering. The alumina hydrate was aged for a period of 14 days to convert to a mixture of aluminas comprising (dried) about 50% gibbsite (containing some randomite), 25% bayerite and 25% boehmite. The material washed 13 times was designated sample No. 400E9078. A slurry of No. 400E9078 was made by mixing 77.55 pounds of No. 400E9078 and 19.4 liters of deionized water.

The slurry was stirred vigorously with cage beaters to effect thorough dispersion. With continued stirring, an ammonium fluoride solution consisting of 45.1 grams ammonium fluoride plus 1550 ml. deionized water was added over a 5-minute period. Stirring was continued for 30 minutes, after which a platinum solution consisting of 251.5 ml. $H_2PtCl_6$ (0.043 gram Pt/ml.) plus 1550 ml. deionized water was added over a 5-minute period. After 5 to 10 minutes additional stirring, hydrogen sulfide solution (2510 ml. of water saturated with hydrogen sulfide) was added slowly. The slurry was stirred an additional 30 minutes before pouring into Pyrex trays for drying in a force-air oven at 110° to 115° C.

The oven dried product was ground and with an added die lubricant (2% Sterotex) was formed into 5/32" tablets. The tablets then were calcined under controlled conditions. The calcination was initiated in an atmosphere of flowing nitrogen, and completed in an oxygen atmosphere (6 hrs., 900° F.). The initial concentration of oxygen was 0.3 volume percent which was maintained until the die lubricant was burned out. The calcination was finished under 100% flowing oxygen and the catalyst was cooled under flowing nitrogen. The finished catalyst was designated 400E9099, sometimes hereinafter referred to as B-2.

By X-ray diffraction the alumina was identified as a mixture of gamma alumina modifications of about 42 Angstrom units crystallite size. The apparent density was 0.71 and the nitrogen area was 411 square meters per gram. The chemical analysis was as follows: 0.33% platinum, 0.62% fluoride, 0.43% chloride, 0.10% carbon and 3.22% volatile matter (ignited at 1000° C.).

EXAMPLE II

A similar catalyst in terms of composition and preparation was prepared by the method outlined in Example I except that the alumina hydrogel was aged for 15 days at room temperature and pH 8 prior to incorporating the platinum and fluoride. The precursor alumina composition by X-ray analysis of dried sample was: 25% gibbsite, 30% bayerite, 16% randomite and 29% boehmite+amorphous. The catalyst was designated No. 400E9027.

By X-ray diffraction the alumina was identified as a mixture of gamma alumina modifications of about 48 Angstrom units crystallite size. The apparent density was 0.80 and the nitrogen area was 463 square meters per gram. The chemical analysis was as follows: 0.29% platinum, 0.72% fluoride, 0.24% chloride and 2.57% volatile matter (ignited at 1000° C.).

EXAMPLE III

Five and one-half liters of one molar aluminum chloride solution was filtered and placed in an 8-gallon stoneware jar fitted with an efficient stirrer. While vigorously stirring, 5,000 grams of a slurry containing gibbsite seed crystals were added. The slurry employed contained a colloidal suspension of previously precipitated and washed alumina hydrate corresponding to 0.4% $Al_2O_3$ as gibbsite and 2.0% $Al_2O_3$ as boehmite.

The mixed alumina chloride-alumina hydrate slurry was stirred for 5 minutes and, while continuing vigorous stirring, an 8-molar ammonium hydroxide solution was slowly added until a pH of 8.0 was obtained. The ammonium hydroxide solution contained 1,350 ml. of concentrated ammonium hydroxide made up to 2,500 ml. of solution with deionized water. The ammonium hydroxide solution was added at a fairly constant rate of about 75 to 80 ml. per minute. The slurry thickened up at about pH=5 (by p-Hydrion paper) and the addition of ammonium hydroxide was discontinued until the slurry became more fluid. After the precipitation was completed, the slurry was stirred for 30 minutes and then the hydrogel was filtered from the mother liquor using a large table-top Buchner funnel.

The hydrogel filter cake was broken up to about 1" pieces and was slurried in 20 liters of deionized water by stirring vigorously for about ½ hour. The slurry was then filtered from the wash liquor using vacuum, but approximately 15 minutes before filtering the pH was adjusted to 8 by addition of ammonium hydroxide. The hydrogel was repeatedly washed in this way until the alumina hydrate had a chloride content of less than 0.2%. Eight washes and 9 filterings were required. X-ray diffraction analysis of a dried sample of the hydrogel (400E9159) indicated a hydrate mixture consisting of 63% gibbsite, 12% bayerite, 9% randomite and about 16% boehmite. The crystallite size of the trihydrates was approximately 500 Angstrom units, per X-ray studies.

A slurry containing 2548 grams of the above hydrogel was mixed with 3 liters of deionized water in a 3-gallon stoneware jar and was stirred vigorously for about 30 minutes until the gel was well dispersed. While vigorously stirring the slurry, 4.76 grams of ammonium fluoride dissolved in 130 ml. of deionized water was slowly added. Stirring was continued for 30 minutes and then 26.5 ml. of chlorplatinic acid solution (containing 0.043 g. Pt/ml.) diluted with 130 ml. of deionized water was slowly added while vigorous stirring was continued. Stirring was continued for 5 minutes and then while continuing vigorous stirring, 264 ml. of deionized water saturated with hydrogen sulfide at 78° F. (100% excess $H_2S$ of that calculated for $PtS_2$) was slowly added. The resulting slurry was light tan in color. After stirring for 30 minutes the slurry was poured into Pyrex trays and dried overnight in an Aminco oven at 110° C. The dried catalyst was ground to pass 20-mesh, mixed with 2% Sterotex and tableted as 5/32" tablets. The tableted catalyst designated 400E9165, was calcined for 6 hours at 900° F. according to the method described in Example I.

By X-ray diffraction the alumina was identified as a mixture of gamma alumina modifications of about 41 Angstrom units crystallite size. The apparent density was 0.63 and the nitrogen area was 446 square meters per gram. The chemical analysis was as follows: 0.35% platinum, 0.62% fluoride, 0.19% chloride and 2.70% volatile matter (ignited at 1000° C.).

EXAMPLE IV

The aluminum hydroxide utilized as a base in this preparation consisted of a mixture of the two following hydrogels (a) and (b) in proportions of ⅓ of (a) and ⅔ of (b). The hydrogels were prepared as follows:

(a) To a vigorously stirred solution of 25.48 lbs. of $AlCl_3 \cdot 6H_2O$ in 51 liters of deionized water was added an ammonium hydroxide solution composed of equal volumes of water and of 0.90 sp. gr. ammonium hydroxide. A total of 19.7 liters of 1:1 $NH_4OH$ brought the pH to 8.2. Thirty-five minutes elapsed time was used for the addition. Ammonium hydroxide addition was discontinued briefly at pH 5 to allow the viscous slurry to become more fluid.

After additional stirring, the precipitate was separated in a plate and frame press. However, the filter cake was "not too solid" which dictated re-slurrying and refiltering, whereupon a more firm cake resulted. The latter was broken into approximately 1-inch cubes, placed into a vessel of deionized water and washed by percolation; i. e. running deionized water past the cake, at ca. 20 gals. per hour. Washing was continued approximately 830 hours.

(b) A second batch of material was prepared by the same procedural steps as employed above. The precipitation was carried out in two batches. In each 25 pounds of $AlCl_3 \cdot 6H_2O$ was dissolved and reacted with 19.7 to 20.0 liters of 1:1 $NH_4OH$–$H_2O$; i. e. to pH 8.2 to 8.3. Percolation washing of the broken filter cakes was conducted for 688 hours at 60 gallons $H_2O$/hr. and for 18.9 hours at 30 gallons $H_2O$/hr.

X-ray diffraction patterns of the above samples indicated small crystallite boehmite plus a small amount of gibbsite. Therefore 41.59 lbs. of preparation (a) and 105.68 lbs. of preparation (b) and 111.45 lbs. of deionized water were stirred together thoroughly and assigned sample No. 400E9086.

By thirty minutes of vigorous stirring 4,240 grams of 400E9086 (equal of 173 g., dry basis, of $Al_2O_3$) was dispersed in 1,350 ml. of deionized water. An ammonium fluoride solution, of 3.41 g. $NH_4F$ plus 135 ml. $H_2O$, was the next addition. This was added in approximately 10 to 15 minutes elapsed time, with temporary discontinuance when the slurry thickened in consistency. Following thirty more minutes of stirring, the addition of chlorplatinic acid (0.613 g. Pt, from 1,425 ml. of $H_2PtCl_6$ solution of 0.043 g. Pt/ml., diluted with 100 ml. of deionized water) solution was started. After 10 minutes of stirring, 142 ml. of deionized water saturated with $H_2S$ (room temperature) was slowly added. Stirring was continued for 30 more minutes, after which the material was transferred into Pyrex trays for drying at 110° C. in a forced-air oven. The dried catalyst was processed by tableting and controlled calcination, including 6 hours at 900° F. in oxygen atmosphere. The product was assigned No. 400E9113.

EXAMPLE V

This example provides X-ray diffraction data (obtained employing 90° Norelco equipment) and information on the analytical technique applicable to the alumina bases of the catalysts of Examples I to III. The following alumina hydrates were encountered in the base compositions tested.

(1) Boehmite, $AlO \cdot OH$: This monohydrate is of small crystallite size, say 30 A.–50 A., and gives broad X-ray diffraction lines.

(2) Bayerite, $Al(OH)_3$: This trihydrate is of large crystallite size (300–1200 A.), and gives sharp X-ray diffraction lines. It is metastable, converting eventually to gibbsite.

(3) Gibbsite, $Al(OH)_3$: This trihydrate is also of large crystallite size, giving sharp X-ray lines. It is the most stable hydrate of alumina.

(4) Randomite: This crystalline form (for which the name "randomite" has been coined) is not reported in the literatures. It is a trihydrate presumably intermediate in structure between bayerite and gibbsite.

Bayerite gives a line at 2.23 A. which can be easily resolved. Bayerite also gives a line at 4.73 A. (18.70° 2θ, Cu radiation), very close to a gibbsite line at 4.85 A. (18.25° 2θ, Cu radiation). The intensities of these three lines are equal. The gibbsite line at 4.85 cannot be cleanly resolved because of the adjacent bayerite line, but the ratio of bayerite and gibbsite can be simply obtained by comparing the area of the bayerite line at 2.23 to the combined areas of the bayerite line at 4.73 and the gibbsite line at 4.85.

The presence of randomite, which gives a line at 4.79 A., introduces additional uncertainty. The intensity of the line at 4.79 is not known experimentally, and thus some assumption must be made concerning it. From the known structure of gibbsite and the postulated structure of bayerite, it is reasonable to assume that the intensity of the 4.79 line is equal to the intensities of the previously discussed bayerite and gibbsite lines. If so, the area of the bayerite line at 2.23 A. (obtained by planimeter) divided by the combined areas of the bayerite peak at 4.73 plus the randomite peak at 4.79 plus the gibbsite peak at 4.85 gives the ratio of bayerite to total trihydrate. Hence, the values reported below as gibbsite concentrations include any randomite which is present.

The combined area of the three lines (at 4.73, 4.79, 4.85) is a linear function of the boehmite concentration, i. e. when the combined area is zero, the boehmite concentration is 100%, and when the combined area is some maximum value, the boehmite concentration is zero percent. For this purpose, a hydrate preparation whose pattern yielded the largest combined area for the three lines was defined as having zero percent boehmite. All other preparations are compared to it, and therefore are relative to it.

In an X-ray diffraction machine there are several units whose operating characteristics may change slightly from time to time. To compensate for such variations, a quartz standard may be used and the peak intensity of a quartz line at 20.7° 2θ is obtained at the time each hydrate pattern is run. The combined area is then corrected by the necessary factor.

We have found that when appreciable amounts of the trihydrates are present, our values for the various components can be reproduced to better than ±5%. As the concentration of boehmite increases the reported values become more certain and reproducible.

The compositional data for the three oven-dried bases follow:

| Base for catalyst No. | 4.7–4.9 A, area, units | Percent Boehmite | Percent Bayerite | Percent Gibbsite (+ Randomite) |
|---|---|---|---|---|
| 400E9027 | 282 | 20 | 39 | 41 |
| B-2 | 275 | 25 | 25 | 50 |
| 400E9165 | 272 | 16 | 12 | 72 |

The data show very similar areas for the 4.7 to 4.9 Angstrom unit region of the X-ray patterns, that is the area under the trihydrate peaks. The values are reported in arbitrary units but are the actual measured areas, i. e. they are not corrected values obtained by using a quartz standard. The base compositions vary somewhat in the type of trihydrates present but are similar in total trihydrate content. Thus the 400E9027 base contains 16% randomite, while the base for B–2 contains comparatively little. In the latter, the bayerite peak at 4.73 A. is clearly resolved from the gibbsite peak at 4.85 A. which is somewhat unusual. The base for 400E9165 contains a high percentage of gibbsite. By contrast the base for the catalyst of Example IV, No. 400E9113, was substantially all boehmite in composition with only a small percentage of trihydrate.

EXAMPLE VI

The following data represent surface area and pore volume determinations on the catalysts of Examples I–IV. The data are based upon determinations of nitrogen adsorption-desorption isotherms made by standard volumetric methods. From these data one can compute pore distributions by the method of Barrett, Joyner and Halenda (JACS 73, 373, (1951)). The calculations are performed by starting at saturation on the isotherms, taking increments of volume corresponding to certain increments of pore radius, and making the necessary corrections. The pore volume and area for each increment are summed and the calculation is stopped when the summation of pore volume equals the observed (saturation) pore volume. The summation of surface area agrees with the BET area within an average deviation of about 5%. The pore size at which calculations are discontinued is recorded as the size of the smallest pores.

A pore distribution curve may be calculated by plotting cumulative pore volume vs. pore size, and differentiating graphically. However, it is more convenient to tabulate the volume in certain arbitrary ranges of pore size which has been done in the following table for a number of alumina bases, and for the corresponding virgin and aged catalysts. Although the data are not shown, total pore volumes measured by the isotherm method agree with those determined by helium-mercury displacement. Thus there are no very large pores missed by the isotherm technique. The analytical data are tabulated on the following table:

*Table 1*

| Description of sample | Area (sq.m./gm.) BET [1] | Area (sq.m./gm.) P. D. [2] | Size of smallest pores (A) | Total pore volume (cc./gm.) | Pore volume (cc./gm.) in pores of the indicated pore size [4] ranges | | | | | |
|---|---|---|---|---|---|---|---|---|---|---|
| | | | | | 20A | 20–50A | 50–100A | 100–300A | 300–1000A | 1000+A |
| No. 400E9027 | 463 | 419 | 8 | 0.617 | 0.195 | 0.055 | 0.046 | 0.216 | 0.098 | 0.007 |
| Aged No. 400E9027, 14% C | 107 | 107 | 16 | 0.505 | 0.022 | 0.067 | 0.056 | 0.195 | 0.154 | 0.011 |
| Aged No. 400E9027, 0% C [3] | 228 | 216 | 12 | 0.617 | 0.080 | 0.115 | 0.061 | 0.188 | 0.164 | 0.009 |
| "B–2" | 409 | 399 | 9 | 0.659 | 0.177 | 0.086 | 0.053 | 0.213 | 0.105 | 0.025 |
| Aged B–2, 3.1% C | 168 | 183 | 15 | 0.603 | 0.047 | 0.127 | 0.066 | 0.177 | 0.166 | 0.020 |
| Aged B–2, 0% C [3] | 199 | 188 | 17 | 0.626 | 0.041 | 0.147 | 0.080 | 0.177 | 0.161 | 0.020 |
| Base alumina for No. 400E9165, uncalcined | 163 | 160 | 11 | 0.571 | 0.052 | 0.094 | 0.045 | 0.106 | 0.192 | 0.082 |
| No. 400E9165 | 446 | 420 | 8 | 0.760 | 0.190 | 0.092 | 0.038 | 0.202 | 0.205 | 0.033 |
| Boehmite base for No. 400E9113, uncalcined | 352 | 367 | 13 | 0.361 | 0.166 | 0.190 | 0.003 | 0.002 | 0 | 0 |
| No. 400E9113 | 362 | 366 | 12 | 0.390 | 0.140 | 0.235 | 0.005 | 0.006 | 0.004 | 0 |

[1] Brunauer—Emmet—Teller Method.
[2] Pore distribution.
[3] Carbon removed at 900° F. using 2% O₂ then air.
[4] The term "pore size" refers to the radius of cylindrical pores, or the separation between parallel platelets, and is used as long as the shapes of the pores are indeterminate.

EXAMPLE VII

Illustrative activity data for the catalysts of Examples I to IV tested under comparative conditions with bench scale equipment are tabulated below:

| Catalyst—400E | 9027 | B–2 | 9165 | 9113 |
|---|---|---|---|---|
| Liquid hourly space velocity of feed | 4 | 4 | 4 | 4 |
| P. s. i. g. | 720 | 720 | 720 | 720 |
| Hydrogen/hydrocarbon, mole ratio | 5 | 5 | 5 | 5 |
| 870° F. test results: | | | | |
| Stabilized reformate, weight percent | 90.2 | 88.5 | 83.2 | 89.2 |
| Overhead, weight percent | | | | |
| Octane number, neat, research method | 75.4 | 79.6 | 79.7 | 78.3 |
| 890° F. test results: | | | | |
| Stabilized reformate, weight percent | 86.9 | 83.3 | 83.6 | 86.8 |
| Overhead, weight percent | | 2.6 | 3.3 | |
| Octane number, neat, research method | 84.3 | 84.5 | 85.8 | 83.6 |

The feed stock was a Mid-Continent naphtha of the following characteristics:

| | |
|---|---|
| °API | 54.5 |
| Dist. IBP, °F | 237 |
| 10% Pt | 253 |
| 50% Pt | 286 |
| 90% Pt | 337 |
| E. P. | 367 |
| Paraffins, percent | 44.3 |
| Olefins, percent | 1.2 |
| Naphthenes, percent | 43.8 |
| Aromatics, percent | 10.7 |
| Sulfur, percent | 0.02 |
| R. O. N. (neat) | 39.0 |

EXAMPLE VIII

The performance of our new catalysts in improving reforming processing becomes apparent when the catalysts are tested for activity, stability and selectivity in continuous aging tests. The data of this example were obtained by charging the catalysts to a stainless steel reactor tube either as a solid bed or dispersed with 8- to 14-mesh tabular alumina. Before beginning hydrocarbon processing, the reactor is purged with nitrogen to remove air and the catalyst bed is purged with hydrogen at atmospheric pressure while the temperature is gradually raised to the operating level. After the reactor has been brought up to operating temperature, e. g. 900° F., the hydrogen purge is continued at 1700 space velocity for 12 hours. At the end of this reduction period, the entire system is pressured with hydrogen, the temperature adjusted and the hydrocarbon feed stock is cut in by opening the feed valve. The mixture of feed and recycle gas passes over the catalyst bed and the effluent is passed to a receiver where the condensible liquid is removed. The gas phase is then pumped back to the catalyst bed. Excess recycle gas is withdrawn from the system. Periodically the liquid product is withdrawn into an evacuated bomb and is stabilized by drawing from the bomb into a glass pot held at 60° F. The stabilized liquid is tested for research octane number neat by the micro method. The net hydrogen make is calculated from the volume of excess recycle gas released. In the following aging runs, feed stocks of the below tabulated characteristics were employed:

| | Mid-Continent naphtha | California C₆-naphtha cut | California C₆-naphtha cut |
|---|---|---|---|
| °API | 54.5 | 55.7 | 55.4 |
| Dist.: | | | |
| IBP, °F | 237 | 161 | 245 |
| 10% Pt | 253 | 163 | 248 |
| 50% Pt | 286 | 165 | 251 |
| 90% Pt | 337 | 169 | 256 |
| E. P. | 367 | 195 | 266 |
| Paraffins, percent | 44.3 | 9.5 | 36.2 |
| Olefins, percent | 1.2 | | |
| Naphthenes, percent | 43.8 | 87.8 | 59.0 |
| Aromatics, percent | 10.7 | 2.7 | 4.8 |
| Sulfur, percent | 0.02 | 0.004 | 0.010 |
| R. O. N. (neat) | 39.0 | 87.8 | 58.4 |

The catalyst described in Example II, 400E9027, was tested by the above procedure under conditions of continuous processing designed to produce an 80 octane number (neat) reformate while processing the Mid-Continent naphtha feed stock (run 9–38). During the run of 2500 hours, a pressure of 750 p. s. i. g., hydrogen to hydrocarbon ratio of 6/1 and a liquid hourly space velocity of 4.0 was maintained. The initial temperature was 890° F. which was dropped to 880° F. after 200 hours. At approximately 1100 hours the temperature was raised again to 890° F. to hold the desired octane level. At approximately 1750 hours the temperature was raised to 900° F. and the last 400 hours of the run were conducted at 910° F. The octane level of the reformate approximated 80 very closely for the duration of the run, although an octane decline of about 80 to 75 gradually set in over the last several hundred hours of the run with a liquid volume percent recovery around the 90% level. The net hydrogen make remained at a 250 to 270 cubic feet per barrel level for about the first 1800 hours of the run. During the latter part of the run a gradual decline set in to about a 100 cubic feet per barrel level.

In a similar fashion an aging test (13–12) was conducted employing the catalyst of Example I, B–2, to process the Mid-Continent naphtha under conditions of 900° F., 500 p. s. i. g., 5 liquid hourly space velocity and 13/1 hydrogen to hydrocarbon ratio. This run continued for 700 hours at the 85 octane level (research neat) with production of better than 90 volume percent liquid yield The net gas make was about 550 to 600 cubic feet per barrel. At about 700 hours, the temperature was raised 10° F. to maintain octane and gas make and continued for another 300 hours. At about 1000 hours, the temperature was again raised 10° F. and the run was continued. At about 1250 hours the temperature then was raised another 5° F., then successively to 930° F. and 940° F. and at about 1550 hours was raised to 950° F. where it was maintained until the conclusion of the run after 1846 hours due to a decline in octanes from about the 82 level to about 72 with a gas make of about 230 cubic feet per barrel over the last hundred hours of the run.

By comparison (run 14–12), the high gibbsite base catalyst described in Example III, 400E9165, was producing better than 90 volume percent liquid yield of 83 to 85 octane number neat reformate from the Mid-Continent naphtha at the point where the above run with catalyst B–2 was discontinued. At this point, the processing over catalyst 9165 was at a 15° lower temperature, the yield was 2% greater and the product octanes were 3 numbers higher. At 1520 hours, the temperature was raised 10° to 920° F. to maintain octanes in the 83 to 84 level. At about 2265 hours, the temperature was again raised 10° to 930° F. which raised the octanes from 81–82 to near the 83–84 level. At 2540 hours, the temperature was raised to 940° F. as octanes declined to the 80-level and net gas make declined about 100 cu. ft./bbl. to 550. The run was concluded after 2707 hours since the last temperature increase from 930° to 940° F. gave only an additional 150–160 hours of life at perhaps 82 octane average, and it was not thought profitable to continue processing by raising the temperature further. Liquid recoveries remained at or above the 90 volume percent level throughout the run.

By contrast to the stability shown in the above continuous aging runs, an 85 octane level run (9–42) with the boehmite base catalyst of Example IV, 400E9113, processing the Mid-Continent naphtha at 900° F., 500 p. s. i. g., 5 liquid hourly space velocity and 13/1 hydrogen to hydrocarbon ratio had to be concluded at about 550 hours due to declining octanes and sharply declining net gas make.

In a 95 octane level run at a temperature of 934° F. (925–930° F. for first 20 hours), 500 p. s. i. g., 2.9 weight hourly space velocity and 10/1 hydrogen to hydrocarbon ratio, the catalyst of Example I, B–2, performed at the 95 octane level or above for about 300 hours and above the 90 octane level for over 460 hours with about 81–82 volume percent liquid yield. At 460 hours, an operational mishap deteriorated the catalyst.

By contrast in a similar run testing the performance of the boehmite base catalyst of Example IV, 400E9113, the 90 octane level was reached at 200 hours and the run was concluded at 223 hours in view of the steady decline in octanes to about 87 and the marked decline in net gas make from about 800 cubic feet per barrel to about 550 cubic feet per barrel.

To test the benzene producing capacity of the catalyst described in Example I, B–2, a continuous aging run (13–15) was conducted employing the California $C_6$-naphtha cut as feed stock. The run was conducted at a temperature of 910° F., 200 p. s. i. g., 1.5 liquid hourly space velocity and a hydrogen to hydrocarbon ratio of 10/1. The run produced liquid yield at about the 80 volume percent level with a net hydrogen make of about 2000 to 2100 cubic feet per barrel. The yield of benzene in the liquid was about 75% and the yield of toluene about 4%. After 1185 hours the temperature was increased to 920° F. and at 1653 hours the temperature was increased to 930° F. At this point the yield of benzene was about 60% and the yield of toluene about 3% and about 230 to 240 gallons of benzene had been produced per pound of catalyst. After 2300 hours, the yield of benzene had dropped to about 50 weight percent. The run was concluded after 2770 hours at which point the yield had dropped to about 40% and the liquid recovery had increased to over 90%. Approximately 250 gallons of benzene were produced per pound of catalyst.

In a similar fashion, the performance of the same catalyst was tested processing the 75% overhead of the California $C_8$-naphtha concentrate for xylenes production (12–17). At 890° F., 300 p. s. i. g., 3 weight hourly space velocity and a 10/1 hydrogen to hydrocarbon recycle ratio, the product octanes ran at the 95 to 97 level with yields of liquid product in the order of 90 to 91 volume percent. After 455 hours, the feed stock was changed from the 75% overhead cut to an 80 percent overhead cut with all other conditions remaining the same. Octanes continued at the 95 to 96 level. At 682 hours the feed was changed to a 65% overhead cut. Product octane numbers were about one octane number lower than those from the earlier 75% and 80% overhead feeds. After 2000 hours of operation during which period both yields and octanes remained stable, the feed was changed to a $C_7$-naphtha cut from the same crude source for toluene production. After 500 hours, toluene production continued to run about 55 weight percent yield of a 90 volume percent total liquid recovery. At this point the feed was charged back to the original 75% overhead from the $C_8$ fraction in order to determine whether any catalyst deactivation had occurred. After a 24-hour check on the original feed during which octanes averaged 97.4 research neat, the run was concluded at 2508 hours since it was apparent that little if any catalyst deactivation had occurred.

EXAMPLE IX

A. *Description of alumina hydrate base.*—The base for this catalyst, 400E9757, was an alumina hydrate, 516–27, which was 71 days old. The composition of the dried hydrate (by X-ray diffraction) was: 29% gibbsite, 42% bayerite, 22% randomite, 6% boehmite and traces of amorphous. The crystallite size of the trihydrate phases appeared to be small.

The 516–27 base was prepared by adding $1NH_4OH$: $1H_2O$ to a solution of vigorously stirred $AlCl_3 \cdot 6H_2O$ (1 lb. of $AlCl_3 \cdot 6H_2O/2$ l. of deionized water) until the pH equalized 8.0. The hydrate was filtered from the mother liquor and washed to 0.27% Cl (by filter press washing procedure). Reslurries were made using approximately 3 gal. of deionized $H_2O$/lb. of $Al_2O_3$ and the pH of the slurries was adjusted to 8.0 (first reslurry), 9.0, 8.5 and 8.5 (fourth reslurry). The washed hydrate was aged as a filter cake.

B. *Impregnation of alumina hydrate base.*—2 l. of alumina hydrate 516–27 slurry (containing 123 g.

Al₂O₃/l.) was placed in a 3 gal. stoneware jar and stirred vigorously for 30 minutes to effect thorough dispersion. With continued stirring, a platinum solution consisting of 34.3 ml. of H₂PtCl₆ solution (0.043 gm. Pt/ml.)+170 ml. of deionized water was added over a 5 minute period. After 10 minutes' additional stirring, hydrogen sulfide solution (343 ml. of deionized water saturated with H₂S at 78° F.) was added slowly. The slurry was stirred an additional 30 minutes prior to drying. The resulting slurry was very thin and light brown in color.

C. *Drying, tableting and calcination.*—The slurry from above was poured into a Pyrex tray and placed in Aminco (forced air) oven at 110° C. After a few hours it was noted that the drying was not uniform and a rubber-like film had formed on the surface. This film could be redispersed in undried portion of slurry; therefore, to make the slurry (probably 40–50% solids) homogeneous, it was placed in a Waring Blendor for about 30 seconds. The drying was then completed at 110° C.

The dry catalyst was ground to pass 20 mesh, mixed with 2% Sterotex and formed as 5/32″ tablets. The Sterotex was burned out at 900° F. using 5 parts air plus 300 parts N₂ atmosphere; the O₂ content was then slowly increased, and finally the catalyst was calcined 6 hours at 900° F. in straight air.

The calcined catalyst was assigned No. 400E9757.

EXAMPLE X

The following virgin activity data were obtained on catalyst 400E9757 under test conditions of 500 p. s. i. g., 4.4 WHSV and 5H₂/HC with a naphtha feed of about 245° to 400° F. distillation range, 56% paraffins, <1% olefins, 24% naphthenes and 19% aromatics.

| Temperature of test, ° F | 870 | 890 | 910 |
|---|---|---|---|
| Wt. percent stabilized reformate | 86.8 | 82.8 | 79.0 |
| Wt. percent O. H. | | 1.3 | 2.3 |
| Research method octane number (neat) | 79.9 | 86.4 | 91.1 |

In a series of aging runs at 925° F., 500 p. s. i. g., 10/1 hydrogen to hydrocarbon ratio and 3 weight hourly space velocity, the virgin catalyst declined from an initial octane, CFRR (neat), of about 97 to about the 90 level in 500 hours. After regeneration with dilute oxygen at 800° F., the same catalyst ran for about 800 hours before declining to the 90-level. After a second regeneration, the catalyst again showed an activity decline curve slightly better than that of the virgin catalyst estimated after an additional 375 hours. Yields approximated 80% liquid (60/ F.) and net gas make was 900–1000 cubic feet per barrel or more during the on-stream test time.

EXAMPLE XI

A. *Description of alumina hydrate base.*—The base for this catalyst, 400F9572, was an alumina hydrate 400F9516. The composition of the dried hydrate by X-ray diffraction analysis was: 9% amorphous, 10% boehmite, 28% bayerite, and 53% randomite+gibbsite. The hydrate was of relatively small crystallite size.

The alumina hydrate 400F9516 was a composite of two alumina hydrate preparations, each made by the following procedure: The alumina hydrate was precipitated by continuously adding 11.5 liters of 1NH₄OH:1H₂O (deionized) solution, at a rate of approximately 400 ml. per minute, to a vigorously stirred solution to AlCl₃·6H₂O (15 lbs. of AlCl₃·6H₂O. Mallinckrodt analytical reagent grade dissolved in 30 liters of deionized water and filtered to remove any insolubles) until the pH equalled 8.0. The precipitation was completed in approximately 30 minutes. The slurry thickened up at pH 4.5 to 5.0 and ammonium hydroxide addition was discontinued for approximately 30 seconds until stirring was efficient. After the precipitation was complete, the slurry was stirred for 30 minutes and the hydrate was filtered from the mother liquid using a plate and frame filter press. The filter cake was washed in the press about 16 hours with flowing deionized water at a temperature of about 75° to 80° F. The alumina hydrate was removed from the filter press and reslurried in 15 gallons of deionized water. The pH was then adjusted to 9.0 by adding a solution of 1NH₄OH:1 water (deionized). The hydrate was filtered in the plate and frame press and washed approximately 16 hours with deionized water at 75° to 80° F. The washing just described was repeated and the final washed cake contained less than about .1% Cl. Two batches of washed hydrate were composited where one batch had aged 12 days (from precipitation) and the other 7 days. The composite was mixed thoroughly and assigned No. 400F9516.

B. *Impregnation of alumina hydrate base.*—1,625 grams of alumina hydrate composite, 400F9516, equivalent to 150 grams Al₂O₃, was placed in a three gallon stoneware jar and dispersed in 2 liters of deionized water by vigorously stirring for 15 to 20 minutes. With continued stirring a platinum solution consisting of 34.9 ml. of H₂PtCl₆(0.043 gram Pt/ml.) plus 175 ml. of deionized water was added. After ten minutes additional stirring, hydrogen sulfide water (350 ml. of deionized water saturated with H₂S at 78° F.) was slowly added. The slurry was stirred an additional 30 minutes prior to drying.

C. *Drying, tabletting and calcination.*—The resultant slurry from above was poured into a Pyrex tray and dried in an Aminco (forced air) oven at 120° C. The dry catalyst was ground to pass 20 mesh, mixed with 2% Sterotex and formed as 5/32″ tablets. The Sterotex was burned out at 900° F. using a flowing 5 parts air plus 300 parts nitrogen atmosphere for 9 hours. The calcination atmosphere was then changed to straight air and the catalyst was calcined for 3 hours at 900° F. in straight air. The calcined catalyst, which was assigned No. 400F9572, contained 0.99 weight percent platinum, had an apparent density (g./cc.) of 0.71, and 3.13 weight percent volatile matter (ignited at 1000° C.).

EXAMPLE XII

The following virgin activity data were obtained for catalyst 400F9572 under test conditions of: 500 p. s. i. g. 4.4 WHSV and 5H₂/HC with a naphtha feed of about 245° to 400° F. distillation range, 56% paraffins, <1% olefins, 24% naphthenes and 19% aromatics.

| Temperature of test, ° F | 890 | 925 |
|---|---|---|
| Weight percent stabilized reformate | 84.9 | 77.5 |
| Weight percent O. H. | 2.2 | 4.2 |
| Research method octane number (neat) | 81.8 | 90.9 |

In an aging run with Mid-Continent naphtha at 940° F., 500 p. s. i. g., 10:1 H₂/HC ratio and 3 WHSV, the catalyst declined from an initial octane CFRR (neat), of 96½ to the 90 level in about 525 hours. Average yields for the test approximated 85% liquid (60° F.) and a net gas make of about 950 cubic feet per barrel of feed.

EXAMPLE XIII

A. *Description of the alumina hydrate base.*—The base for this catalyst, 400F9680, was alumina hydrate 400F9675. This hydrate was a composite prepared in the same manner as the hydrate composite described in Example XI. The composition of the dried hydrate composite by X-ray diffraction was: 14% boehmite, 28% bayerite, 29% randomite, and 29% gibbsite. The crystallite size of the trihydrate phase was small.

B. *Impregnation of alumina hydrate base.*—11.6 kg. of a slurry of alumina hydrate, 400F9675, and deionized H₂O (containing 1.12 kg. of Al₂O₃) was placed in an 8 gal. stoneware jar and dispersed in 3.4 liters of deionized water by vigorously stirring for 90 minutes. With continued stirring a platinum solution consisting of 156.3 ml. of H₂PtCl₆ solution (0.043 g. Pt/ml.) plus 750 ml. of deionized water was added over a 5-minute period.

After 10 minutes additional stirring, hydrogen sulfide water (1560 ml. of deionized water saturated with H₂S at 78° F.) was slowly added. The slurry was stirred an additional 30 minutes, pH equalled 5.9.

C. *Drying, tabletting and calcination.*—The resultant slurry from above was poured into 5 Pyrex trays and dried in an Aminco (forced air) oven at 120° C. The dried catalyst was ground and screened to obtain a 12 to 20 mesh fraction. 323 grams of this material was calcined in the same manner as described in Example XI. The calcined catalyst, which was assigned number 400F9680, contained 0.59 weight percent platinum, had an apparent density of (g./cc.) of 0.60, 2.75 weight percent volatile matter (ignited at 1000° C.), and a surface area equal to 467 sq. meters per gram.

EXAMPLE XIV

The following virgin activity data were obtained for catalyst 400F9680 under test conditions of 500 p. s. i. g., 4.4 WHSV and 5 H₂/HC with a naphtha feed of about 245° to 400° F. distillation range, 56% paraffins, 1% olefins, 24% naphthenes and 19% aromatics.

| Temperature of test, ° F | 890 | 925 |
|---|---|---|
| Weight, percent stabilized reformate | 85.4 | 79.0 |
| Weight, percent O. H. | 1.6 | 4.3 |
| Research method octane number (neat) | 81.4 | 94.0 |

In an aging run with mid-Continent naphtha at 925° F., 500 p. s. i. g., 10:1 H₂/HC ratio, and 3 WHSV, the catalyst declined from an initial octane CFRR (neat), of 97½ to the 90 level in about 650 hours. Average yields for the test approximated 80% liquid (60° F.) and the net gas make of about 950 cubic feet per barrel of feed. On testing with a Venezuela naphtha at 925° F., 500 p. s. i. g., 10:1 H₂/HC ratio and 3 WHSV, the catalyst declined from an initial octane CFRR (neat), of 97 to 94 in 850 hours. Average yields for the test approximated 85% liquid (60° F.) and a net gas make of about 800 cubic feet per barrel of feed.

EXAMPLE XV

The base for this catalyst, 410G9647, was an alumina hydrate, 516–240, which was aged as a filter cake until the composition of the dried hydrate (by X-ray diffraction) was: 18% gibbsite, 38% bayerite, 29% randomite, 13% boehmite, and 2% of amorphous. The crystallite size of the trihydrate phases appeared to be small.

The 516–240 base was prepared by precipitation through mixing of aqueous AlCl₃ and aqueous NH₄OH. The aluminum chloride was prepared by dissolving pure aluminum in pure hydrochloric acid. The resulting solution was mixed with deionized water to prepare an aqueous solution equivalent to 65 grams of Al₂O₃ per liter. An aqueous ammonium hydroxide solution was employed which was made from deionized H₂O and which contained approximately 65 grams of NH₃ per liter. The hydrate was precipitated by mixing together at 99° F. and in the volume ratio of about 1:1 the AlCl₃ and NH₄OH solutions while maintaining the pH of the mixture at about 8. The mixing was accomplished by feeding the solutions to the suction side of a Jabsco pump having a rubber fin impeller which forced the solutions against the pump casing. The pump passed the resulting slurry to a tank. The hydrate was filtered from the mother liquor and washed to 0.01% Cl by five washes on a rotary vacuum filter followed by two washes in a filter press. Reslurries were made after each filteration by the addition of deionized water and the pH of the slurries was adjusted to 9.0 before each of six filtrations which followed the original filtration of the reaction mixture. The washed hydrate was aged as a filter cake. The filter cake analyzed 0.01% chloride and 0.008% iron.

25.8 kg. of an aqueous slurry of deionized water containing 2.0 kg. of aluminum oxide in the form of aged filter cake were placed in a stoneware container. This slurry was stirred during the introduction over a five-minute period of 117.3 cc. of a deionized water solution of H₂PtCl₆ containing 12 grams of platinum. Over a thirty-minute period were added while stirring 2760 cc. of deionized water saturated with H₂S at 78° F. The product was mixed while stirring with 20 cc. of concentrated NH₄OH which yielded a final pH of 8.4. The slurry was filtered on eight frames of a Sperry rubber filter press and the separated catalyst was then washed in the filter press, reslurried and dried using a drum dryer heated with about 30 pound saturated steam.

1047 grams of the drum dried catalyst powder and 345 ml. of deionized water were mixed in a 12 quart Readco planetary-type dough beater for ten minutes. The resulting mixture was forced through a 1/16-inch die by means of a welding engineer's 2-inch twin screw extruder. The resulting strands were broken by hand and sieved to yield a fraction between 1/16-inch and 5/32-inch lengths. These pellets were oven dried at 110° C. for sixteen hours and then heated in a vertical silica calciner. During calcination the catalyst was brought to 470° C. in a flow of nitrogen and then held for three hours between 430° and 475° C. in a flow of air. During the calcination 650 volumes of gas per hour were employed for each volume of catalyst.

The calcined catalyst was assigned number 410G9647. The catalyst analyzed: 0.508 weight percent platinum, 0.092 weight percent chloride, 0.008 weight percent iron, and volatile matter (ignited at 1000° C.) 2.85 weight percent.

EXAMPLE XVI

Catalyst 410G9647 was employed in a reforming reaction and gave results showing performance comparable with that of catalyst 410H9008 prepared according to the procedure observed in preparing catalyst 410G9647 except that 410H9008 was not prefiltered before drying after platinum impregnation, and thus contained 0.61% platinum and 0.80% chloride. These catalysts were contacted under accelerated test conditions with 38.6 Research Method Octane (neat) Mid-Continent straight run naphtha typically of 246° to 359° F. ASTM distillation boiling point range and analyzing:

| | Percent |
|---|---|
| Paraffins | 46.7 |
| Olefins | <1 |
| Naphthenes | 44.8 |
| Aromatics | 8.3 |

The reformations using this feed stock were conducted for 48 hours at 940° F., 200 p. s. i. g. and 5 moles of gas recycle per mole of hydrocarbon feed. The recycle gas consisted principally of hydrogen with a minor amount of methane being present. The naphtha feed was charged to the reaction vessel at the rate of 15 WHSV (space velocity in weight of hydrocarbon per weight of catalyst per hour). The stabilized reformate from the reaction using 410G9647 had an initial research method octane (neat) of 89. The initial research octane method (neat) of the stabilized reformate from 410H9008 was 91.4.

4.22 grams of catalyst 410G9647 and 410H9008 were separately employed in continuous reforming operations for further determination of performance and aging characteristics. The reaction conditions were 940° F., 500 p. s. i. g., 15 WHSV and 7 moles of recycle gas per mole of naphtha, and the naphtha feed was essentially similar to that employed in the accelerated test runs. Both the feed and the recycle gas were dried before entering the reactor. These runs continued for more than 550 hours and the results obtained showed that the initial octanes and the rates of octane decline were substantially similar. For instance, the octanes of the reformates from both catalysts after about 50 hours of processing were about 87 research method octane (neat). At about 300 hours the octanes were about 86 while at 500 hours catalyst 410H9008 gave reformate of about 84 research method octane (neat), while catalyst 410G9647 produced reformate of about the same octane if not an octane or so higher.

EXAMPLE XVII

The base for this catalyst, 410G9337, was an alumina hydrate containing twelve individually prepared alumina-base lots. Eleven of these lots were prepared by an identical procedure. This procedure included dissolving pure aluminum in pure hydrochloric acid and then mixing the resulting solution with deionized water to form an aqueous $AlCl_3$ solution equivalent to approximately 65 grams of $Al_2O_3$ per liter. This solution was mixed with a deionized water solution of $NH_4OH$ containing approximately 65 grams of ammonia per liter. The two reagents in an approximate volume ratio of 1:1 were charged to a common flow pipe and contacted each other without producing a visible precipitate. The contact time of the flowing stream after mixing was one second and the overall stream was at a pH of 8.0. The reagents combined to precipitate the alumina hydrate at the pH of 8.0 when the liquid stream impinged upon the surface of a stoneware container into which it was passed or upon the surface of slurry being passed to and agitated in the container. The hydrate was filtered from the mother liquor and washed to the chloride concentration noted in Table II below. In the washing five filtrations were effected by using a rotary vacuum filter and after each filtration the cake was reslurried in deionized water and the pH of the slurries was adjusted to 9.0 by $NH_4OH$ addition except in the case of batch 516–173 in which the slurry to the second filtration was at a pH of 8.0. The washed hydrate was aged as a filter cake for the number of days noted in Table II.

The hydrate base was impregnated with platinum by slurrying in deionized water in a stoneware container and the amount of $Al_2O_3$ hydrate slurried in each of the preparations is noted in Table II. The hydrate was impregnated with platinum by contact with a solution in deionized water of $H_2PtCl_6$ and followed by contact with a deionized water solution saturated with $H_2S$ at 78° F. to precipitate the platinum. The pH of the slurry was adjusted to 7.0 by $NH_4OH$ addition and the solids of the slurry were dried in a horizontal spray drier to give a powder.

In the twelfth batch (516–200) the hydrate and platinum impregnated powder were prepared in the same manner as the first eleven batches except that the precipitation of the hydrate from the aluminum chloride and ammonium hydroxide solutions was effected by mixing these reagents at a pH of 8.0 in a Jabsco pump having a rubber fin impeller which forced the solutions against the pump casing. Other data regarding this preparation is noted in Table II. In each of the twelve preparations the crystallite size of the aluminum trihydrate phases after aging appeared to be small.

Table II

| Base No. 516 | Hydrate precipitation temperature, °F. | Analysis of washed hydrate before platinum impregnation, weight percent | | Weight percent of dried hydrate in overall base for catalyst | Hydrate filter cake aging time, days | Composition of base (XRD) | | | | | Kg. $Al_2O_3$ slurry for platinum impregnation | Weight percent $Al_2O_3$ in impregnation slurry | pH before $H_2PtCl_6$ addition |
|---|---|---|---|---|---|---|---|---|---|---|---|---|---|
| | | Cl | Fe | | | Percent amorphous | Percent Boehmite | Percent Bayerite | Percent Randomite | Percent Gibbsite | | | |
| 169 | ------ | .17 | .003 | 15.6 | 14 | 21 | 17 | 22 | 28 | 12 | 23.4 | 6.4 | 8.2 |
| 170 | 91 | .18 | .003 | 14.1 | 9 | 0 | 13 | 37 | 32 | 23 | 23.4 | 6.9 | 8.0 |
| 173 | 90 | .21 | .004 | ¹11.6 | 21 | 1 | 8 | 41 | 33 | 17 | 23.4 | 6.8 | 7.4 |
| 175 | 93 | .17 | .004 | 6.7 | 16 | 0 | 11 | 37 | 38 | 14 | 23.4 | 6.6 | 8.1 |
| 178 | 91 | .15 | .003 | 6.6 | 13 | 5 | 6 | 40 | 30 | 19 | 23.4 | 6.4 | 8.1 |
| 180 | 93 | .15 | .004 | 9.3 | 15 | 3 | 12 | 37 | 32 | 16 | 23.4 | 6.6 | 8.1 |
| 181 | 90 | .12 | ------ | ²2.0 | 12 | 5 | 15 | 44 | 19 | 17 | 3.9 | 6.5 | 7.6 |
| 182 | 93 | .21 | ------ | ²2.0 | | | | | | | 3.9 | | |
| 186 | 99 | .25 | .009 | 12.3 | 9 | 9 | 15 | 44 | 16 | 16 | 23.4 | 6.6 | 7.9 |
| 188 | 93 | .17 | .004 | 11.2 | 11 | 0 | 13 | 45 | 25 | 17 | 23.4 | 7.2 | 8.0 |
| 199 | 90 | .21 | .004 | 4.3 | 17 | 3 | 9 | 43 | 28 | 17 | 23.4 | 6.3 | 8.3 |
| 200 | 95 | .14 | .004 | 4.3 | 9 | 0 | 14 | 43 | 28 | 17 | 23.4 | 6.7 | 8.3 |

¹ No. 2 filtration, pH 8.0.
² Seeded with ineffective seed then combined.

During spray drying the impregnated slurries of batches 516–175 and 516–178 were combined as were the impregnated slurries of batches 516–181, 516–182 and 516–186.

A composite of the portions of the spray dried catalyst powder was made and 4000 grams of this composite were mixed for ten minutes with 1140 ml. of deionized water in a 20-quart Readco planetary-type dough beater. The resulting mixture was forced through a ⅛₆-inch die by means of a welding engineer's 2-inch twin screw extruder. The resulting strands were broken by hand and sieved to yield a fraction between ⅛₆-inch and ⁵⁄₃₂-inch lengths. The extruded particles were oven dried at 110° C. for sixteen hours and then heated in a vertical silica calciner. During calcination the catalyst was brought to 480° C. in a flow of nitrogen and then held for three hours between 470° C. and 480° C. in a flow of air. During calcination 650 volumes of gas per hour were employed for each volume of catalyst.

The calcined catalyst No. 410G9337 analyzed 0.6 weight percent platinum, 0.67 weight percent chloride, 0.004 weight percent iron and 4.08 weight percent volatile matter (ignited at 1000° C.).

EXAMPLE XVIII

Catalyst 410G9337 was contacted under accelerated test conditions with about 38 research method octane (neat) Mid-Continent straight run naphtha typically of 246° to 359° F. ASTM distillation boiling point range and analyzing:

| | Percent |
|---|---|
| Paraffins | 46.7 |
| Olefins | <1 |
| Naphthenes | 44.8 |
| Aromatics | 8.3 |

Two reforming runs of 48 hours each using this feed stock were conducted at 940° F., 200 p. s. i. g., and 5 moles of gas recycle per mole of hydrocarbon feed. The recycle gas consisted principally of hydrogen with a minor amount of methane being present. The naphtha feed was charged to the reaction vessel at a space velocity of 15 WHSV. In one aging run the initial research method octane (neat) was 89.7 while in another aging run the initial research method octane (neat) was 89.8.

The reforming activity of catalyst 410G9337 was exhibited in a pilot plant operation. The pilot plant contained three essentially adiabatic reactors in series, i. e. the entire feed stock went to the first reactor and the total effluent of the first and second reactors passed respectively to the second and third reactors. A preheater was provided in the feed line for the first reactor while interheaters were disposed in the effluent lines between the first and second reactors and the second and third reactors. The effluent from the third reactor was led to an atmospheric pressure flash drum and the overhead gases which consisted principally of hydrogen and contained a minor amount of methane were dried, treated for hydrogen sulfide removal and compressed before being combined with the feed passing to the preheater for the first reactor.

The first reactor was charged with 6.5 pounds of catalyst in a bed 18¼ inches high supported on 1½ inches of ⅜" alumina ceramic balls and topped with 1¾ inches of the ceramic balls. Both the second and third reactors were identically charged with 5 pounds of catalyst in a 14-inch bed supported on 5 inches of the ceramic balls and topped with 3 inches of the ceramic balls. At the beginning of the reforming operation the feed stock was a blend of straight run naphthas from Near East crudes (Abqaiq-Kuwait) of ASTM distillation boiling range of 200° to 370° F. of research method octane (neat) of 35 to 36 of average analysis:

| | Percent |
|---|---|
| Paraffins | 65 |
| Olefins | <1 |
| Naphthenes | 21 |
| Aromatics | 13 |

This was employed for the first 1571 hours on stream and the reaction conditions of all reactors were held constant for this period except for temperature. The constant conditions were 2 WHSV, 500 p. s. i. g. and 7 moles of recycle gas per mole of naphtha feed.

Table III

| Total barrels feed/lb. catalyst | Approx. run time, days | Stabilized reformate research method octane (neat) | Feed inlet temperature to all reactors, ° F. |
|---|---|---|---|
| 0 to 5 | 27½ | 82 (initial) to 95 (final). | 910 (initial) to 950 (final). |
| 5 to 10¼ | 28¾ | 95 (initial)¹ to 90 (final). | 950. |
| 10¼ to 11 | 4 | 95 | 970. |

FIRST REGENERATION (DESCRIBED BELOW)

| 11 to 12 ² | 5½ | 95 | 950. |

¹ Degree of decline due to stoppage caused by mechanical difficulties.
² Pilot plant shut down for other processing use, reactors emptied, total reaction time to this point was 1571 hours.

The first regeneration was effected by first purging the reactors with nitrogen and then burning the carbon from the catalyst. Carbon burning was conducted at 130 p. s. i. g. and 700° to 750° F. at the reactor inlet. The regenerating gas was dry, contained 0.7% oxygen, and was obtained by adding oxygen to recycled flue gases after a start-up with nitrogen. The beds were burned through one at a time in series with the gas flow following the path of the naphtha feed. After each bed was burned its temperature was raised to 940° F. After all three beds were burned, the oxygen content of the regenerating gas was gradually raised to that of air and then dry air was passed over the catalyst for 24 hours.

It was noted that after 1571 hours of processing the chloride concentration of the catalyst had decreased. For instance, the virgin catalyst analyzed 0.67% chloride while the catalyst after 1571 hours of use analyzed only about 0.04 to 0.05% chloride. Upon further processing to 4800 hours total the chloride content of the catalyst analyzed from about 0.13 to 0.46% depending on location in the system. This gain in chloride was from an extraneous source which was apparently the feed stock.

In recharging the reactors for further processing the catalyst was placed into the reactor from which it was withdrawn and the various portions were replaced at substantially the same bed level. Some of the catalyst was not reused so each reactor upon recharging had 4.6 pounds of catalyst in a 13-inch bed. Each bed was over 5½ inches of the ceramic balls and was topped with 3½ inches of the balls.

The processing run then continued under the same conditions of pressure, gas recycle and space velocity observed during the original processing, except as noted in the table following:

Table IV

| Feed stock | Total barrels feed/lbs. catalyst | Approx. run time, days | Stabilized reformate research method octane (neat) | Feed inlet temperature to all reactors, ° F. |
|---|---|---|---|---|
| Abqaiq-Kuwait ¹ | 12 to 14.5 | 13¾ | 95 | 950-955 |
| Mid-Continent ² | 14.5 to 16.2 | 9¼ | 93 | 960 |
| Abqaiq-Kuwait | 16.2 to 16.75 | 3 | 96 | 960 |
| Mid-Continent | 16.75 to 18.25 | 8¼ | 93-95 | 960-965 |
| Abqaiq-Kuwait | 18.25 to 18.9 | 3¾ | 97 | 965 |
| Mid-Continent | 18.9 to 21.45 | 14 | 95 | 965 |
| Abqaiq-Kuwait | 21.45 to 22.15 | 9¼ | 97 | 965 |
| Mid-Continent | 22.15 to 28 | 32¼ | ³ 88.5-97 | 965 |
| Abqaiq-Kuwait | 28 to 28.9 | 5 | ⁴ 89 | 965 |

SECOND REGENERATION—ESSENTIALLY SAME AS FIRST REGENERATION

| Abqaiq-Kuwait | 28.9 to 30 | 6 | 98 | 950 |
| Mid-Continent | 30 to 32.35 | 13 | 96.5 | 950 |
| Mid-Continent | 32.35 to 35.4 | 11.5 | Temperatures and octane varied considerably for observation | |

¹ Same feed as in original processing.
² Mid-Continent straight run naphtha, ASTM distillation boiling point range 245-365° F., Research Method Octane (neat) 38, paraffins 48%, olefins <1%, naphthenes 43%, aromatics 8%.
³ Three different pressure periods of 500, 350 and 200 p. s. i. g.
⁴ Low octane due to previous low pressures causing faster aging of catalyst.

At the end of the pilot plant run the catalyst had been on process for about 4800 and 35.4 barrels of feed per pound of catalyst had been charged. The catalyst was taken from the reactors and found to be in condition for many additional hours of processing. The pilot plant run was stopped since data which might be gathered during further processing did not justify the expense. During the pilot plant processing the catalyst exihibited a good yield-octane curve. Representative yields and octanes are listed below.

Table V

| Processing period, feed bbls./lb. cat. | C₅-EP, RMO (neat) | C₅-EP, Vol. percent | Location of processing period and feed |
|---|---|---|---|
| 6.1 to 6.45 | 95.3 to 95.5 | 71 to 73.5 | Before 1st regeneration Abqaiq-Kuwait. |
| 11.5 to 11.7 | 95 to 95.8 | 73.6 to 75.7 | After 1st regeneration Abqaiq-Kuwait. |
| 22.28 to 22.46 | 96.1 to 96.4 | 78 to 78-9 | After 1st regeneration Mid-Continent. |
| 29.19 | 98.2 | 72.7 | After 2nd regeneration Abqaiq-Kuwait. |
| 29.38 | 98.4 | 73.5 | Do. |
| 30.31 to 30.67 | 96.4 to 97 | 78.1 to 79.5 | After 2nd regeneration Mid-Continent. |

The above examples and data are illustrative of results with alumina-platinum and alumina-platinum-fluoride promoted catalysts since these catalysts appear to have the highest selectivity and activity stability in ordinary reforming processing. Following analogous preparation techniques, however, rhodium, palladium or iridium or mixed platinum metal catalysts can be prepared of improved performance due to the influence of the alumina base structure. The metal is incorporated in the precursor alumina composition by adding an aqueous solution of a water soluble salt, e. g. rhodium chloride or iridium chloride, or mixture of salts, to the hydrate slurry folowed by in situ precipitation with hydrogen sulfide. A promoter is added if desired as in the above examples.

Except for X-ray diffraction data, unless otherwise indicated when specifying percentages of components of the catalyst composition and of the alumina hydrate we refer to weight percent on an ignited basis. Also, surface areas as mentioned above are calculated on an ignited weight basis.

This application is a continuation-in-part of application Serial No. 288,058, filed May 15, 1952, now abandoned.

We claim:

1. A catalyst having reforming activity and essentially comprising calcined alumina and a platinum metal having reforming activity which is characterized by large pore, high area base structure essentially composed of gamma alumina modifications resulting from the drying and calcination of a mixture of precursor hydrous alumina phases containing about 65 to 95% of trihydrate, said catalyst containing from about 0.1% to about 1% by weight of a platinum metal, said platinum metal being present in sufficiently finely divided form as to exhibit by X-ray diffraction studies, the substantial absence of crystallites and crystals of size larger than about 50 Angstrom units, said catalyst after calcining and before use having an area (BET method) of from about 350 to about 550 square meters per gram.

2. A catalyst as in claim 1 in which the platinum metal is platinum.

3. The process of reforming light hydrocarbon stocks to produce gasoline, benzene and other selected aromatics, which comprises contacting the hydrocarbon stock under reforming conditions of temperature, pressure and hydrogen partial pressure with a reforming catalyst as defined in claim 1.

4. The process of reforming light hydrocarbon stocks to produce gasoline, benzene and other selected aromatics, which comprises contacting the hydrocarbon stock under reforming conditions of temperature, pressure and hydrogen partical pressure with a reforming catalyst as defined in claim 2.

References Cited in the file of this patent

UNITED STATES PATENTS

| | | |
|---|---|---|
| 1,739,306 | Holmes | Dec. 10, 1929 |
| 2,069,060 | Fessler | Jan. 27, 1937 |
| 2,456,633 | Haensel | Dec. 21, 1948 |
| 2,475,155 | Rosenblatt | July 5, 1949 |
| 2,478,916 | Haensel et al. | Aug. 16, 1949 |
| 2,479,110 | Haensel | Aug. 16, 1949 |
| 2,623,860 | Haensel | Dec. 30, 1952 |
| 2,636,865 | Kimberlin | Apr. 28, 1953 |
| 2,658,028 | Haensel et al. | Nov. 3, 1953 |
| 2,663,620 | Haensel | Dec. 22, 1953 |
| 2,667,461 | Guyer et al. | Jan. 26, 1954 |
| 2,689,226 | Hoekstra | Sept. 14, 1954 |